US012252242B2

(12) United States Patent
Briggi et al.

(10) Patent No.: US 12,252,242 B2
(45) Date of Patent: Mar. 18, 2025

(54) COMPLIANT HELICOPTER ROTOR PITCH LINK

(71) Applicant: The Boeing Company, Arlington, VA (US)

(72) Inventors: Conor Briggi, Philadelphia, PA (US); Todd Waaramaa, Chandler, AZ (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/314,601

(22) Filed: May 9, 2023

(65) Prior Publication Data

US 2024/0375771 A1  Nov. 14, 2024

(51) Int. Cl.
*B64C 27/72* (2006.01)
*B64C 27/605* (2006.01)

(52) U.S. Cl.
CPC ............ *B64C 27/72* (2013.01); *B64C 27/605* (2013.01); *B64C 2027/7255* (2013.01)

(58) Field of Classification Search
CPC ............................... B64C 27/72; B64C 27/605
See application file for complete search history.

(56) References Cited

U.S. PATENT DOCUMENTS

| | | | | |
|---|---|---|---|---|
| 3,175,619 A | * | 3/1965 | Reed, Jr. | B64C 27/022 416/37 |
| 3,415,324 A | * | 12/1968 | Austin, Jr. | F16C 7/06 416/61 |
| 5,749,540 A | * | 5/1998 | Arlton | B64C 27/82 244/17.19 |
| 8,857,757 B2 | * | 10/2014 | Fenny | B64C 27/72 244/99.4 |
| 11,052,993 B2 | * | 7/2021 | Cravener | B64C 27/605 |
| 2016/0236773 A1 | * | 8/2016 | Jolly | B64C 27/001 |

* cited by examiner

*Primary Examiner* — Michael L Sehn
(74) *Attorney, Agent, or Firm* — Hanley, Flight & Zimmerman, LLC

(57) ABSTRACT

A helicopter rotor blade control pitch link for transmitting movement of a rotating swashplate to a rotor blade pitch horn includes a spring module. The spring module includes at least one elastic member configured to generate link compliance when a force is transferred through the pitch link from the rotating swashplate to the rotor blade pitch horn. A plurality of such rotor blade control pitch links is used in a helicopter rotor blade control system having a swashplate assembly operatively connected to each of a rotor shaft and a rotor having a plurality of rotor blades with respective rotor pitch horns. Each rotor blade pitch link is configured to control a pitch of one rotor blade via the corresponding rotor blade pitch horn.

19 Claims, 5 Drawing Sheets

COMPLIANT HELICOPTER ROTOR PITCH LINK

This invention was made with government support under Agreement. No. W911W6-19-9-0003 awarded by the Department of Defense. The Government may have certain rights in the invention.

INTRODUCTION

The present disclosure relates to a helicopter rotor pitch link with built-in compliance for control of rotor stability during helicopter flight.

A helicopter includes a flight control system enabling a pilot to control the aircraft's take-off and landing and maintain the aircraft in stable aerodynamic flight. Changes to the flight control system are transmitted mechanically to helicopter's main rotor, producing aerodynamic effects on the rotor blades that make the aircraft move in a deliberate way. To tilt forward and back (pitch) or sideways (roll) requires the controls to alter the angle of attack of the main rotor blades cyclically during rotation, creating differing amounts of lift (force) at different points in the cycle. An increase or decrease in rotor thrust requires the controls to alter the angle of attack for all rotor blades collectively by equal amounts at the same time, resulting in ascent, descent, acceleration, and deceleration.

Helicopter flight controls include a swashplate assembly configured to transmit pilot commands to a rotating rotor hub and the main rotor blades. The swashplate assembly generally includes two main parts-a stationary swashplate and a rotating swashplate. The stationary and the rotating swashplates tilt up and down as one unit. The swashplate assembly is mounted on the main rotor shaft through a uniball and slider bearing, enabling the system to tilt in all directions and move axially. An anti-rotation link constrains axial rotation of the static swashplate about the main rotor shaft, permitting operational connections to flight control actuators. The rotating swashplate is mounted to the stationary swashplate by means of a swashplate bearing and is allowed to rotate around the static swashplate and the main rotor shaft. Another anti-rotation link constrains the rotating swashplate to the axial rotation of the rotor hub and rotor blades. The rotating swashplate is connected to rotor blade pitch horns by pitch links for controlling pitch of the blades and tilting the helicopter in a desired direction.

SUMMARY

A helicopter rotor blade control system includes a swashplate assembly operatively connected to a rotor shaft and to a rotor having a plurality of rotor blades with respective rotor pitch horns. The swashplate assembly includes a stationary swashplate mounted on the rotor shaft and a rotating swashplate rotatably mounted to the stationary swashplate via a swashplate bearing. The rotor blade control system also includes a plurality of pitch links configured to transmit movement of the rotating swashplate to the rotor blade pitch horns for controlling a pitch of each rotor blade. Each pitch link includes a spring module having at least one elastic member configured to generate link compliance when a force is transferred through the respective pitch link from the rotating swashplate to a corresponding rotor blade pitch horn.

Each pitch link may also include a casing arranged along a longitudinal axis and configured to house the spring module. Each pitch link may further include two opposing tie rods-a first tie rod operatively connected to the spring module and a second tie rod operatively connected to the casing.

Each pitch link may additionally include a plunger arranged inside the casing on the longitudinal axis, connected to one of the first and second opposing tie rods, and configured to compress the spring module when the respective pitch link transmits the force to control the pitch of a corresponding rotor blade.

Each pitch link may also include a cap configured to interlock with the casing and thereby enclose the spring module and retain the plunger inside the casing.

Each pitch link may additionally include an adjustment mechanism configured to select a preload of the corresponding pitch link.

The adjustment mechanism may include a threaded connection between the casing and the cap.

The subject at least one elastic member may be one or more Belleville springs. At least some of the Belleville springs may be arranged in series.

At least some of the Belleville springs may be arranged in parallel.

Each pitch link may also include a compressible damping element.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
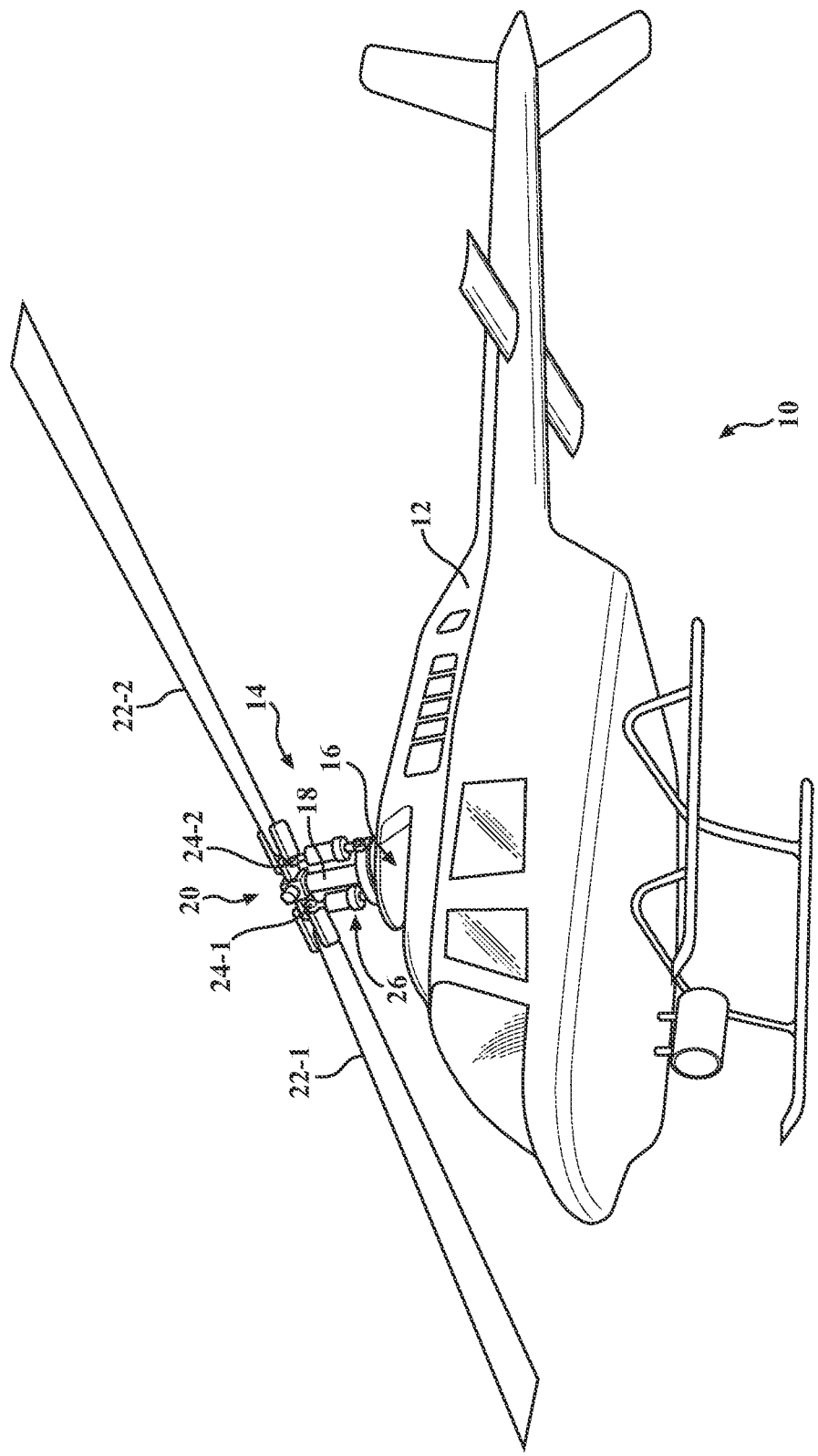
FIG. 1 is a schematic perspective view of a helicopter with a main rotor system and a plurality of rotor blades operatively connected to an engine via a rotor shaft, according to the present disclosure.

Those having ordinary skill in the art will recognize that terms such as "above", "below", "upward", "downward", "top", "bottom", "left", "right", etc., are used descriptively for the figures, and do not represent limitations on the scope of the disclosure, as defined by the appended claims. Referring to the drawings, wherein like reference numbers refer to like components, FIG. 1 shows an embodiment of a helicopter 10 having a fuselage 12 having a cockpit for the helicopter's pilot(s) interfacing with helicopter flight controls via a rotor blade control system 14. The helicopter 10 also has one or more engines 16. Each engine 16 may be arranged on and mounted to the fuselage 12, as shown.

The engine(s) 16 is operatively connected to a rotor shaft 18, such as via a transmission assembly (not shown). As shown in FIG. 1, a rotor 20 is driven by the engine(s) 16 via the rotor shaft 18 for generating aircraft lift. Although not shown, the helicopter 10 may also include a tail rotor or be a compound aircraft having a propeller. The rotor 20 may be a main rotor (as shown in FIG. 1), a tail rotor, or a thrust providing propeller (such as in a compound aircraft). In other words, the present disclosure is broadly applicable to a helicopter rotating blade system. The rotor 20 has a plurality of rotor blades, shown as individual rotor blades 22-1 and 22-2 having a plurality of respective rotor pitch horns 24-1 and 24-2. Although two rotor blades 22-1, 22-2 are specifically shown, an embodiment of the main rotor 20 with a greater number of rotor blades is also envisioned. The rotor blade control system 14 includes a swashplate assembly 26 operatively connected to each of the main rotor shaft 18 and the rotor 20, specifically connecting the rotor shaft to the rotor blades 22-1 and 22-2 via the respective rotor pitch horns 24-1 and 24-2. The swashplate assembly 26 is configured to control pitch of the rotor blades 22-1 and 22-2 for controlled flight of the helicopter 10.

Figure 2:
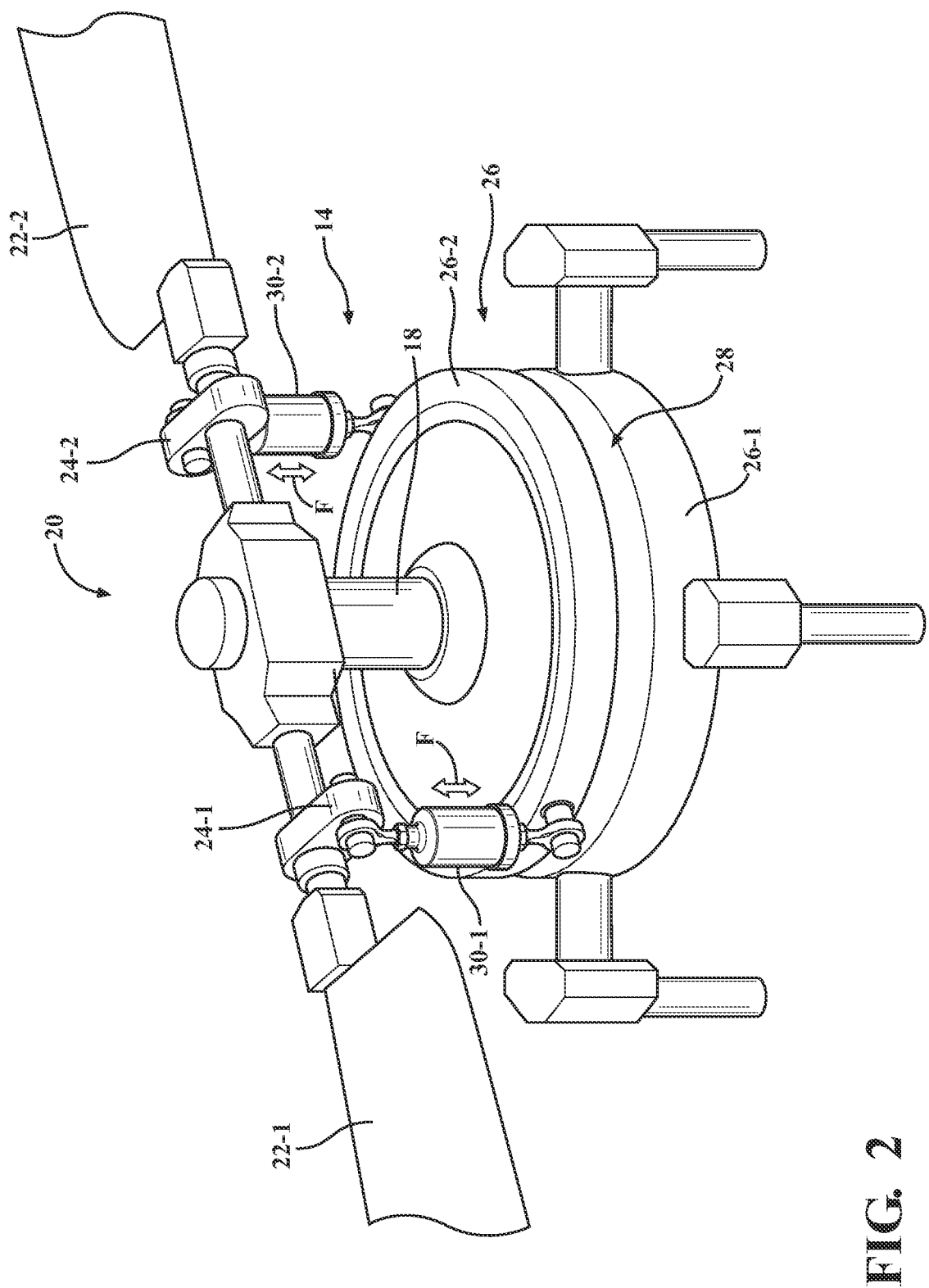
FIG. 2 is a schematic close-up view of a swashplate assembly operatively connecting the rotor blades to the rotor shaft shown in FIG. 1, depicting stationary and rotating swashplate components of the swashplate assembly and a plurality of pitch links for transmitting movement of the rotating swashplate to the rotor blades, according to the disclosure.

With reference to FIG. 2, the swashplate assembly 26 includes a stationary swashplate 26-1 mounted on the engine-powered main rotor shaft 18. The stationary swashplate 26-1 is also operatively connected to the helicopter flight controls, while being able to tilt in all directions and move vertically. The swashplate assembly 26 also includes a rotating swashplate 26-2 rotatably mounted to the stationary swashplate 26-1 via a swashplate bearing 28, which is arranged therebetween. The stationary and the rotating swashplates 26-1, 26-2 may tilt as one unit relative to the rotor shaft 18. The rotor blade control system 14 additionally includes a plurality of pitch links, shown as pitch links 30-1 and 30-2, configured to transmit movement of the rotating swashplate 26-2 to the respective rotor blade pitch horns 24-1 and 24-2. Specifically, as shown, the rotating swashplate 26-2 is connected to the rotor blade pitch horns 24-1, 24-2 via the pitch links 30-1, 30-2 for controlling pitch of each corresponding rotor blade 22-1, 22-2 and regulate movement of the helicopter 10 during flight. The swashplate assembly 26 also includes an anti-rotation link (not shown) configured to rotationally fix the rotating swashplate 26-2 to the main rotor 20 and prevent the rotating swashplate from turning independently of the rotor blades 22-1, 22-2. The swashplate assembly 26 may include another anti-rotation link (not shown) configured to rotationally fix the static swashplate 26-1 to lower controls operated by the pilot(s).

Figure 3A:
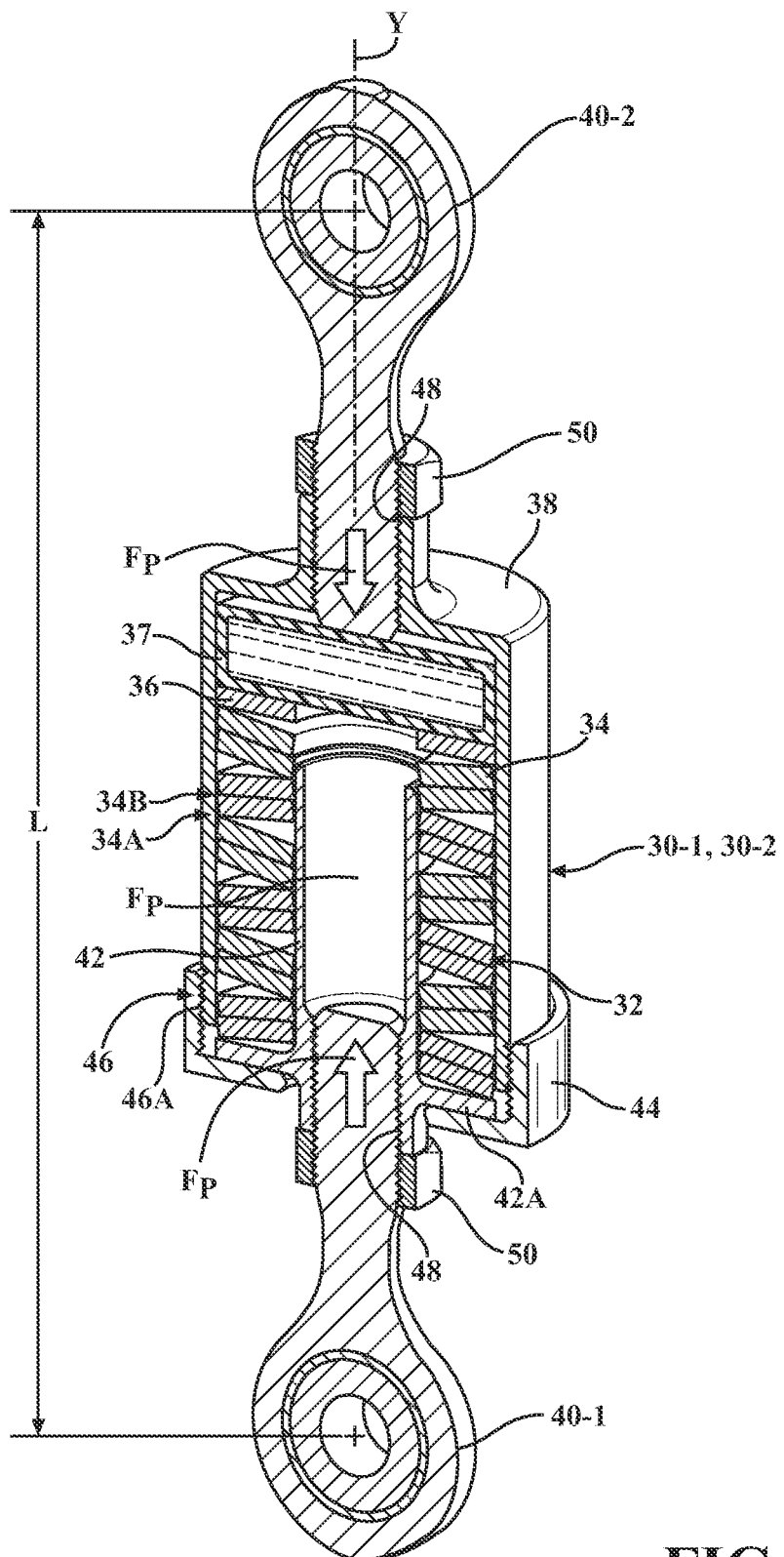
FIG. 3A is a schematic close-up cross-sectional view of an embodiment of one pitch link shown in FIG. 2 having an internal spring module, specifically depicting an embodiment of the spring module having a plurality of Belleville springs arranged in series and parallel and a compressible damping element, according to the disclosure.
Figure 3B:
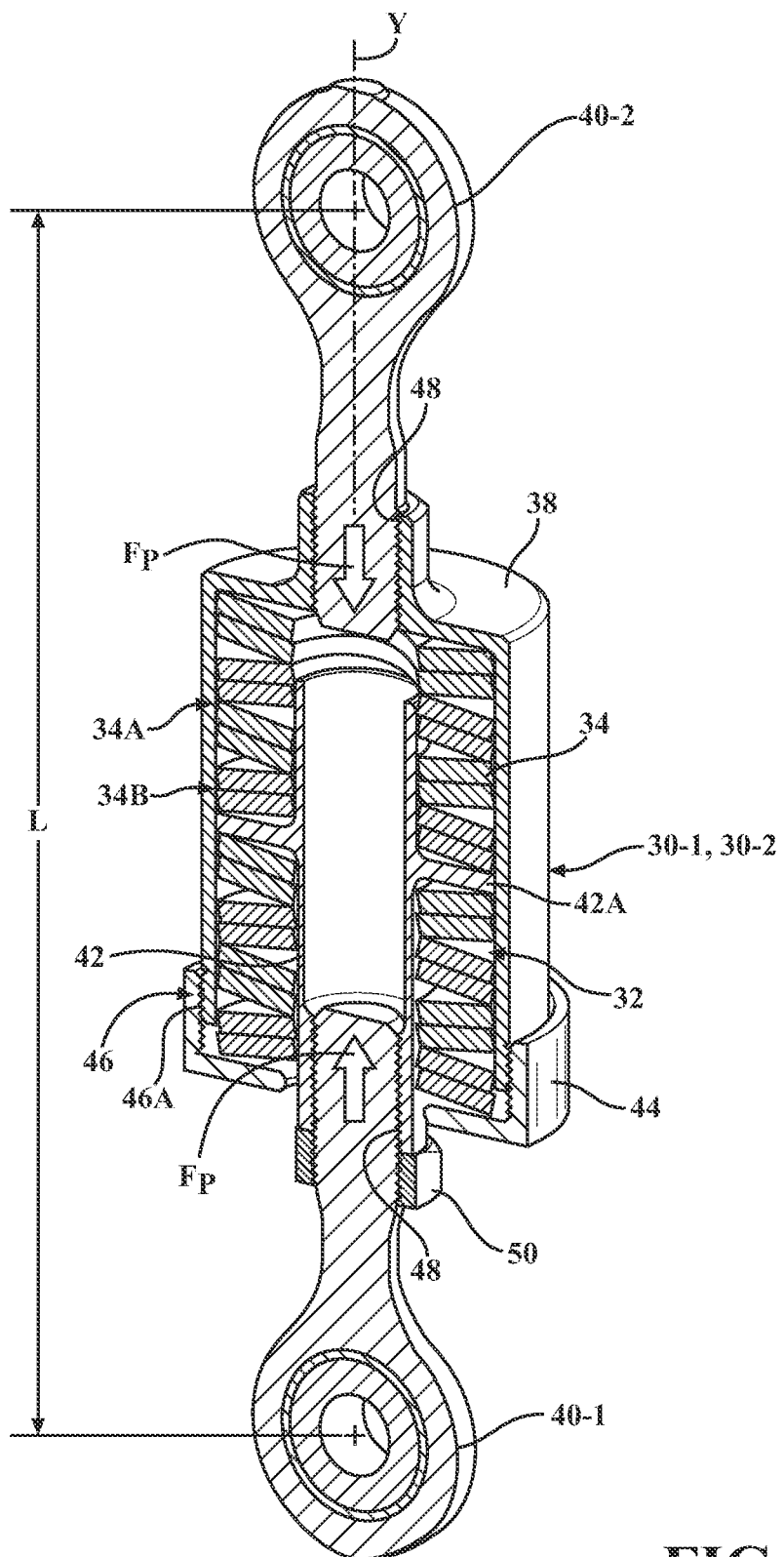
FIG. 3B is a schematic close-up cross-sectional view of another embodiment of the pitch link shown in FIG. 2 having an internal spring module configured to be actuated in tension and compression, according to the disclosure.

During helicopter 10 operation, the rotor blades 22-1, 22-2 may experience instability and vibration. Stiffness of the control system has a significant influence on rotor blade stability. High stiffness of the control system may increase transmission of rotor vibration into the structure of helicopter 10, which may degrade ride quality and structural integrity of the aircraft. On the other hand, excessive compliance in the control system generally degrades responsiveness, i.e., handling qualities, of the aircraft. By appropriately balancing stiffness of the control system, performance of the helicopter 10 may be optimized to ensure blade stability and desired responsiveness, without negatively impacting the aircraft structure. As shown in FIGS. 3A and 3B, each pitch link 30-1, 30-2 includes a spring module 32 configured to balance stiffness of the control system. The spring module 32 includes at least one elastic member 34 configured to generate link compliance when an actuation force F is transferred through the respective pitch link 30-1 or 30-2 from the rotating swashplate 26-2 to the corresponding rotor blade pitch horn 24-1 or 24-2. Specifically, compliance is generated in the pitch link 30-1 or 30-2 when the link is subjected to the actuation force F exceeding a predetermined threshold or preload $F_p$.

Figure 4:
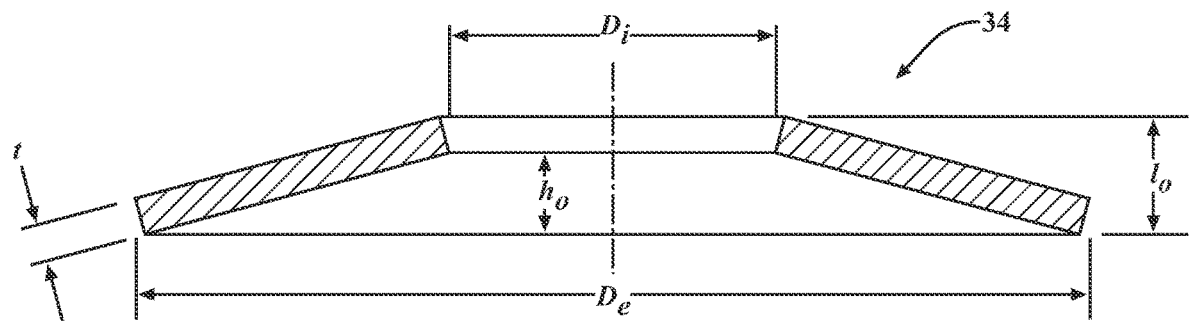
FIG. 4 is a schematic close-up cross-sectional view of a Belleville spring elastic member in a free state, according to the disclosure.
Figure 5:
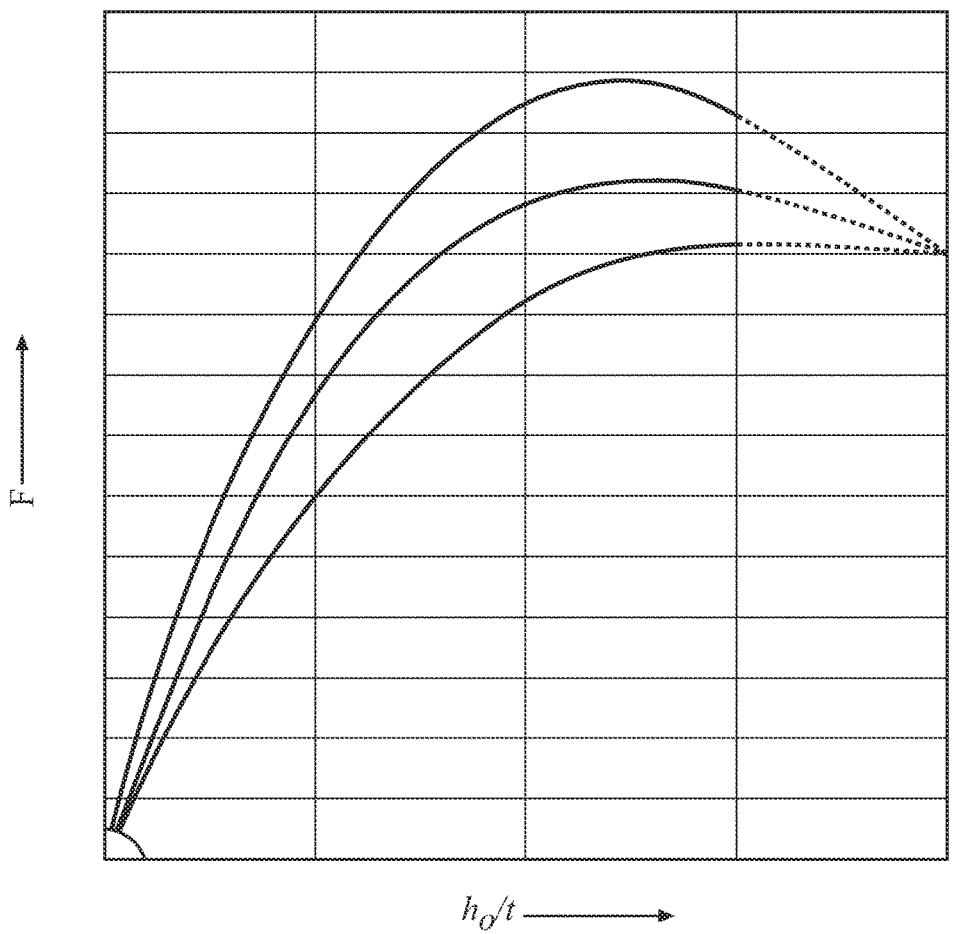
FIG. 5 is an illustration of three representative Belleville spring load-deflection curves for use in the pitch link spring module.

As shown in FIG. 4, each elastic member 34 may be a Belleville or cone spring. As may be seen in FIG. 5, a Belleville spring generally has a nonlinear spring-rate. The spring module 32 may include a plurality of such Belleville springs to optimize assembly compliance. As shown in FIGS. 3A and 3B, at least some of the subject Belleville springs may be arranged in series 34A, in parallel 34B, or in a combination of the two. In the arrangement of the elastic member Belleville springs 34 stacked in parallel 34B, the individual springs may be positioned analogously and substantially nested relative to one-another when viewed in cross-section, to decrease pitch-link 30-1, 30-2 compliance. In the arrangement of Belleville springs 34 positioned in series 34A, the individual springs may be stacked with alternating cone directions to increase pitch link axial compliance. Additionally, as shown in FIG. 3A, the spring module 32 may include spacer(s) or partition(s) 36 between neighboring springs to facilitate reliable positioning of individual springs and decrease spring module 32 axial compliance.

With reference to FIG. 4, the Belleville springs 34 are typically specified relative to the spring's external diameter $D_e$, internal diameter $D_i$, free height $h_0$, cone height $l_0$, and thickness t. A spring load-deflection curve $h_0/t$ (shown in FIG. 5) for the appropriate Belleville spring(s) may then be calculated based on the defined actuation force F and the preload $F_p$ using a standard cone disc equation. Accordingly, the free height $h_0$ and thickness t dimensions of the subject Belleville spring(s) may be tuned to provide a specific spring strain curve with respect to the actuation force F and the preload $F_p$. Use of such Belleville spring(s) 34 in the spring module 32 will permit the pitch links 30-1 and 30-2 to transmit the actuation force F from the rotating swashplate 26-2 to the rotor blades 22-1, 22-2 and filter out disruptive rotor vibrations generated during maneuvering of the helicopter 10.

Belleville springs 34 may be constructed from an appropriate material, such as spring steel or engineered plastic. Additionally, various coatings may be applied to individual Belleville springs 34 and spacers 36 in each of the Belleville spring 34 arrangements in the interest of reduced friction and wear. The spring module 32 may include each of the above-described series and parallel arrangements of Belleville springs 34 in different series/parallel combinations with different individual spring load characteristics to achieve desired spring module response over predetermined compression and relative to the threshold Ft. Individual spring load characteristics and spring arrangements may be established empirically, such as during controlled system testing using the actuation force F and vibration forces likely to be fed back into the spring module(s) 32 during operation of the helicopter 10.

Alternatively, or in addition to the springs 34 described above, the spring module 32 may employ a compressible damping element 37 (shown in FIG. 3A), which may be a polymer block having internal hysteresis or a viscous fluid bladder. The compressible damping element 37 may be used to generate damping in the spring module 32 to further attenuate the vibrations generated by the rotor blades 22-1, 22-2 and enhance rotor blade stability during maneuvering of the helicopter 10. Each pitch link 30-1, 30-2 may also include a casing 38 arranged along a longitudinal axis Y and configured to house the spring module 32. Each of the pitch links 30-1, 30-2 may additionally include two opposing tie rods—a first tie rod 40-1 and a second tie rod 40-2. The first tie rod 40-1 may be operatively connected to the spring module 32 and to either the rotating swashplate 26-2 or to the corresponding rotor blade pitch horn 24-1, 24-2, and the second tie rod 40-2 may be operatively connected to the corresponding casing 38 and to the other of the rotating swashplate and the corresponding rotor blade pitch horn.

With reference to FIGS. 3A and 3B, each pitch link 30-1, 30-2 may also include a piston or plunger 42. The plunger 42 is arranged inside the casing 38 on the longitudinal axis Y. The plunger 42 may be connected to either the first or second opposing tie rods 40-1, 40-2. The plunger 42 is configured to compress the spring module 32 when the respective pitch link 30-1, 30-2 transmits the actuation force F to control the pitch of the corresponding rotor blade 22-1, 22-2. As shown in FIGS. 3A and 3B, plunger 42 includes a flange 42A configured to compress the internal spring module 32. FIG. 3A illustrates an embodiment of the pitch link 30-1 or 30-2 in which the internal spring module 32 is configured to be actuated in compression. FIG. 3B, on the other hand, illustrates an embodiment the pitch link 30-1 or 30-2 in which the internal spring module 32 is configured to be actuated in tension, as well as in compression owing to the flange 42A being positioned between groups of elastic members 34. Although the compressible damping element 37 is specifically shown in the embodiment of FIG. 3A, nothing precludes one or more of such compressible damping elements being employed in the embodiment of FIG. 3B, such as at each end of the spring module 32.

Each pitch link 30-1, 30-2 may also include a cap 44 configured to interlock with the casing 38 and thereby enclose the spring module 32 and retain the plunger 42 inside the casing. Specifically, the cap 44 may threadedly engage the casing 38 (either on an inside or the outside diameter thereof) to permit convenient assembly and non-destructive disassembly of the spring module 32. In addition, the threaded engagement of the cap 44 with the casing 38 may be used to establish the module 32 preload $F_p$ and thereby regulate the rotor blade control system 14 response. Non-destructive disassembly of the spring module 32 may be used to adjust a number and arrangement of individual elastic members 34, such as the Belleville springs, therein.

With continued reference to FIGS. 3A and 3B, each pitch link 30-1, 30-2 may include an adjustment mechanism 46 having a threaded connection 46A between the cap 44 and the casing 38. The subject adjustment mechanism 46 is configured to regulate the preload $F_p$ and the resultant magnitude of the pitch link 30-1, 30-2 compliance. Each pitch link 30-1, 30-2 may additionally include a threaded connection 48 between the first and/or second tie rod 40-1, 40-2 and the casing 38. The threaded connection 48 is configured to regulate a length of the respective first and/or second tie rod 40-1, 40-2 and an overall length L of the corresponding pitch link 30-1, 30-2. Each tie rod 40-1, 40-2 may include a threaded nut 50 configured to lock the respective tie rod lengths and the resultant selected length L of the corresponding pitch link 30-1, 30-2. Consequently, for a given or constant distance between the respective pitch horn 24-1, 24-2 and the rotating swashplate 26-2, the adjustment mechanism 46 together with the threaded connection(s) 48 permit tailoring the pitch link 30-1, 30-2 length L and the preload $F_p$ to elicit a desired dynamic response of the rotor blades 22-1, 22-2.

Overall, the spring module 32 provides a compressible as compared to a rigid link between the helicopter swashplate assembly and the individual rotor blades for control of rotor stability during helicopter flight. The spring module 32 is therefore intended to permit respective pitch links to actuate the corresponding rotor blades of the helicopter while also filtering out disruptive vibrations generated by the rotor blades during helicopter maneuvers. The spring module 32 may specifically employ Belleville springs to tailor the spring module to a particular helicopter rotor drive application and balance transmission of the actuation force against filtering of the rotor vibrations. The spring module 32 may be a take-apart assembly facilitating convenient replacement of internal springs and their arrangement to tune the spring module during testing on the helicopter.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A helicopter rotor blade control system comprising:
a swashplate assembly operatively connected to each of a rotor shaft and a rotor having a plurality of rotor blades with respective rotor pitch horns, the swashplate assembly including:
a stationary swashplate mounted on the rotor shaft; and
a rotating swashplate rotatably mounted to the stationary swashplate via a swashplate bearing; and
a plurality of pitch links configured to transmit movement of the rotating swashplate to the rotor pitch horns for controlling a pitch of each rotor blade;
wherein each pitch link includes a spring module having a plurality of Belleville springs configured to generate link compliance when a force is transferred through the respective pitch link from the rotating swashplate to a corresponding rotor blade pitch horn; and
wherein at least some of the plurality of Belleville springs are arranged in parallel.

2. The helicopter rotor blade control system of claim 1, wherein each pitch link additionally includes:
a casing arranged along a longitudinal axis and configured to house the spring module; and
two opposing tie rods, including a first tie rod operatively connected to the spring module and a second tie rod operatively connected to the casing.

3. The helicopter rotor blade control system of claim 2, wherein each pitch link additionally includes a plunger arranged inside the casing on the longitudinal axis, connected to one of the first and second opposing tie rods, and configured to compress the spring module when the respective pitch link transmits the force to control the pitch of a corresponding rotor blade.

4. The helicopter rotor blade control system of claim 3, wherein each pitch link additionally includes a cap configured to interlock with the casing and thereby enclose the spring module and retain the plunger inside the casing.

5. The helicopter rotor blade control system of claim 4, wherein each pitch link additionally includes an adjustment mechanism configured to select a preload of the corresponding pitch link.

6. The helicopter rotor blade control system of claim 5, wherein the adjustment mechanism includes a threaded connection between the casing and the cap.

7. The helicopter rotor blade control system of claim 1, wherein the plurality of Belleville springs are arranged in parallel.

8. The helicopter rotor blade control system of claim 1, wherein the spring module additionally includes a compressible damping element configured to generate vibration damping.

9. The helicopter rotor blade control system of claim 8, wherein the compressible damping element includes one of a polymer block having internal hysteresis and a viscous fluid bladder.

10. A helicopter rotor blade control pitch link for transmitting movement of a rotating swashplate to a rotor blade pitch horn, the helicopter rotor blade control pitch link comprising:
a spring module having at least one elastic member configured to generate link compliance when a force is transferred through the pitch link from the rotating swashplate to the rotor blade pitch horn;
a casing arranged along a longitudinal axis and configured to house the spring module;
a first tie rod operatively connected to the spring module;
a second tie rod operatively connected to the casing;
a plunger arranged inside the casing on the longitudinal axis, connected to one of the first and second tie rods, and configured to compress the spring module when the respective pitch link transmits the force to control a pitch of a rotor blade; and
a cap configured to interlock with the casing and thereby enclose the spring module and retain the plunger inside the casing.

11. The helicopter rotor blade control pitch link of claim 10, wherein each pitch link additionally includes an adjustment mechanism configured to select a preload of the corresponding pitch link.

12. The helicopter rotor blade control pitch link of claim 11, wherein the adjustment mechanism includes a threaded connection between the casing and the cap.

13. The helicopter rotor blade control pitch link of claim 10, wherein the at least one elastic member is at least one Belleville spring.

14. The helicopter rotor blade control pitch link of claim 13, wherein the at least one Belleville spring is a plurality of Belleville springs.

15. The helicopter rotor blade control pitch link of claim 14, wherein at least some of the plurality of Belleville springs are arranged in series.

16. The helicopter rotor blade control pitch link of claim 14, wherein at least some of the plurality of Belleville springs are arranged in parallel.

17. The helicopter rotor blade control pitch link of claim 10, wherein the spring module additionally includes a compressible damping element configured to generate vibration damping.

18. The helicopter rotor blade control pitch link of claim 17, wherein the compressible damping element includes one of a polymer block having internal hysteresis and a viscous fluid bladder.

19. A helicopter rotor blade control pitch link for transmitting movement of a rotating swashplate to a rotor blade pitch horn, the helicopter rotor blade control pitch link comprising:
a spring module having at least one Belleville spring configured to generate link compliance when a force is transferred through the pitch link from the rotating swashplate to the rotor blade pitch horn;
a casing arranged along a longitudinal axis and configured to house the spring module;
a first tie rod operatively connected to the spring module;
a second tie rod operatively connected to the casing;
a plunger arranged inside the casing on the longitudinal axis, connected to one of the first and second tie rods, and configured to compress the spring module when the respective pitch link transmits the force to control a pitch of a rotor blade; and
a cap configured to interlock with the casing and thereby enclose the spring module and retain the plunger inside the casing.

* * * * *